(12) United States Patent
Sharma et al.

(10) Patent No.: US 11,086,619 B2
(45) Date of Patent: Aug. 10, 2021

(54) CODE ANALYTICS AND PUBLICATION PLATFORM

(71) Applicant: Morgan Stanley Services Group, Inc., New York, NY (US)

(72) Inventors: Girish Sharma, Pennington, NJ (US); Kishore Yerramilli, Skillman, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 16/240,612

(22) Filed: Jan. 4, 2019

(65) Prior Publication Data

US 2020/0218533 A1    Jul. 9, 2020

(51) Int. Cl.
*G06F 8/71*     (2018.01)
*G06F 11/36*    (2006.01)
*G06F 8/77*     (2018.01)

(52) U.S. Cl.
CPC .................. *G06F 8/71* (2013.01); *G06F 8/77* (2013.01); *G06F 11/3664* (2013.01); *G06F 11/3676* (2013.01); *G06F 11/3688* (2013.01)

(58) Field of Classification Search
CPC .......... G06F 8/70–72; G06F 8/75; G06F 8/77; G06F 11/3612–3692
See application file for complete search history.

(56) References Cited

U.S. PATENT DOCUMENTS 7,783,750 B1 * 8/2010 Casey ...................... H04L 67/36
709/224
8,856,725 B1 * 10/2014 Anderson ................. G06F 8/75
717/103
9,348,582 B2   5/2016 Pillgram-Larsen et al.
(Continued)

OTHER PUBLICATIONS

Natarajan Meghanathan, "Identification and Removal of Software Security Vulnerabilities using Source Code Analysis: A Case Study on a Java File Writer Program with Password Validation Features", published by Journal of Software, vol. 8, No. 10 , Oct. 2013, pp. 2412-2424 (Year: 2013).*

(Continued)

*Primary Examiner* — S. Sough
*Assistant Examiner* — Zheng Wei
(74) *Attorney, Agent, or Firm* — Weitzman Law Offices, LLC (57) ABSTRACT

A method of software version management for ensuring stability of published code. The method comprises receiving source code for an application; automatically inserting, into the source code or in a testing environment that will execute the source code, additional code to register an attempt by the source code to access an external resource; executing the source code in the testing environment; during execution of the source code, automatically tracking numbers of attempts made to access each external resource of a plurality of external resources; receiving configuration data associating each external resource with a fitness score; based at least in part on each number of attempts to access an external resource and on the fitness score associated with the external resource, determining a total application fitness score; and automatically publishing the source code to a production environment if and only if the total application fitness score exceeds a predetermined threshold.

27 Claims, 5 Drawing Sheets

(56) References Cited

U.S. PATENT DOCUMENTS

| | | | |
|---|---|---|---|
| 10,613,970 B1* | 4/2020 | Jammula | G06F 8/77 |
| 2004/0167976 A1* | 8/2004 | Peer | G06Q 10/10 |
| | | | 709/223 |
| 2005/0229176 A1* | 10/2005 | Findeisen | G06F 11/3423 |
| | | | 718/100 |
| 2006/0037000 A1* | 2/2006 | Speeter | H04L 67/10 |
| | | | 717/120 |
| 2008/0104570 A1 | 5/2008 | Chedguy et al. | |
| 2010/0037211 A1* | 2/2010 | Zakonov | G06F 11/3604 |
| | | | 717/130 |
| 2010/0095268 A1 | 4/2010 | Lowry et al. | |
| 2010/0169874 A1 | 7/2010 | Izard et al. | |
| 2011/0099543 A1* | 4/2011 | Thorley | G06F 8/71 |
| | | | 717/168 |
| 2011/0225577 A1 | 9/2011 | Wookey | |
| 2011/0231836 A1 | 9/2011 | Wookey | |
| 2011/0246982 A1 | 10/2011 | Wookey | |
| 2012/0331439 A1 | 12/2012 | Zimmermann et al. | |
| 2013/0055211 A1* | 2/2013 | Fosback | G06F 8/75 |
| | | | 717/126 |
| 2013/0311968 A1 | 11/2013 | Sharma | |
| 2013/0326481 A1* | 12/2013 | Kannan | G06F 8/71 |
| | | | 717/123 |
| 2014/0013304 A1 | 1/2014 | Vangala et al. | |
| 2015/0234652 A1 | 8/2015 | Naveh et al. | |
| 2015/0363192 A1 | 12/2015 | Sturtevant | |
| 2016/0335555 A1 | 11/2016 | Llanes-Tosar et al. | |
| 2017/0090825 A1* | 3/2017 | Osadchyy | G06F 3/1286 |
| 2017/0091073 A1* | 3/2017 | Abadi | G06F 8/00 |
| 2017/0214701 A1 | 7/2017 | Hasan | |
| 2018/0143826 A1 | 5/2018 | Crabtree et al. | |
| 2018/0285240 A1* | 10/2018 | Kou | G06F 11/3644 |
| 2018/0357047 A1 | 12/2018 | Brown et al. | |
| 2019/0108001 A1* | 4/2019 | Hauser | G06F 11/3604 |
| 2019/0294428 A1* | 9/2019 | Scheiner | H04L 67/34 |

OTHER PUBLICATIONS

Hoek et al., "Software release management for component-based software", published by John Wiley & Sons, Ltd, pp. 77-98 (Year: 2002).*

Buse et al., "Learning a Metric for Code Readability", published by the IEEE Computer Society, IEEE Transactions On Software Engineering, vol. 36, No. 4, Jul./Aug. 2010, pp. 546-558 (Year: 2010).*

Hoek et al., "Software Release Management", published by ACM, ACM SIGSOFT Software 1997, pp. 159-175 (Year: 1997).*

* cited by examiner

CODE ANALYTICS AND PUBLICATION PLATFORM

FIELD OF INVENTION

This application relates to methods and systems for managing the production and publication of programming code, and more specifically, for publishing code if and only if the code meets a certain level of quality and robustness.

BACKGROUND

Modern software development can involve hundreds of developers cooperatively working on mission-critical applications with major consequences for software failure. As a result, extensive and iterative testing of software before publication is invaluable for determining whether software is sufficiently robust and can be trusted by users.

It is a common practice to use three environments for three stages of an application lifecycle. In a development environment, which may simply be a software developer's personal machine, developers are usually free to write and test code arbitrarily without extensive oversight, as the consequences of a software failure will likely be minimal. Once a developer believes code is ready, it is built in a build server, then added to a testing environment, where the testing environment replicates, as closely as possible, the characteristics of the environment or machine that will eventually be used for execution of the software. While in the testing environment, the code may be used in a way that replicates or emulates a user's likely use of the code, to see if the code responds as expected. If code in the testing environment appears to lack any critical bugs, it may be published to the production environment, where it is actually executed in response to user requests or other "real-world" situations.

Modern code often has a multitude of dependencies for proper execution, including, for example: software libraries of pre-written useful code; external or remote services that are accessed by an application programming interface (API) of the service; features of an operating system (OS) being used to execute the code; particular features of a version of a language or of a compiler or interpreter used for the eventual execution of the code; external databases accessed through a query language; other external data stores; input or output devices of a computing device executing the code, such as access to input from a keyboard or mouse, or output to a printer or to a file in a file storage system. Reliance on these dependencies may be disfavored or impossible in a given operating environment.

SUMMARY OF THE INVENTION

Disclosed herein is a method of software version management, comprising receiving, by a central server and from computing devices of one or more software developers, source code for an application; automatically inserting, into the source code or in a testing environment that will execute the source code, additional code to register an attempt by the source code to access an external resource; executing the source code in the testing environment; during execution of the source code, automatically tracking numbers of attempts made to access each external resource of a plurality of external resources; receiving a configuration associating each external resource of the plurality of external resources with a fitness score; based at least in part on each number of attempts to access an external resource and on the fitness score associated with the external resource, determining a total application fitness score; and automatically publishing the source code to a production environment if and only if the total application fitness score exceeds a predetermined threshold.

Further disclosed is a system comprising a testing environment computing device, a production environment computing device, a processor, and non-transitory memory storing instructions that, when executed by the processor, cause the processor to receive, from computing devices of one or more software developers, source code for an application; insert, into the source code or into a testing environment that will execute the source code, additional code to register an attempt by the source code to access an external resource; cause execution of the source code by the testing environment computing device; during execution of the source code, receive numbers of attempts made to access each external resource of a plurality of external resources; receive a configuration associating each external resource of the plurality of external resources with a fitness score; based at least in part on each number of attempts to access an external resource and on the fitness score associated with the external resource, determine a total application fitness score; and automatically publish the source code to the production environment computing device if and only if the total application fitness score exceeds a predetermined threshold.

DETAILED DESCRIPTION

Figure 1:
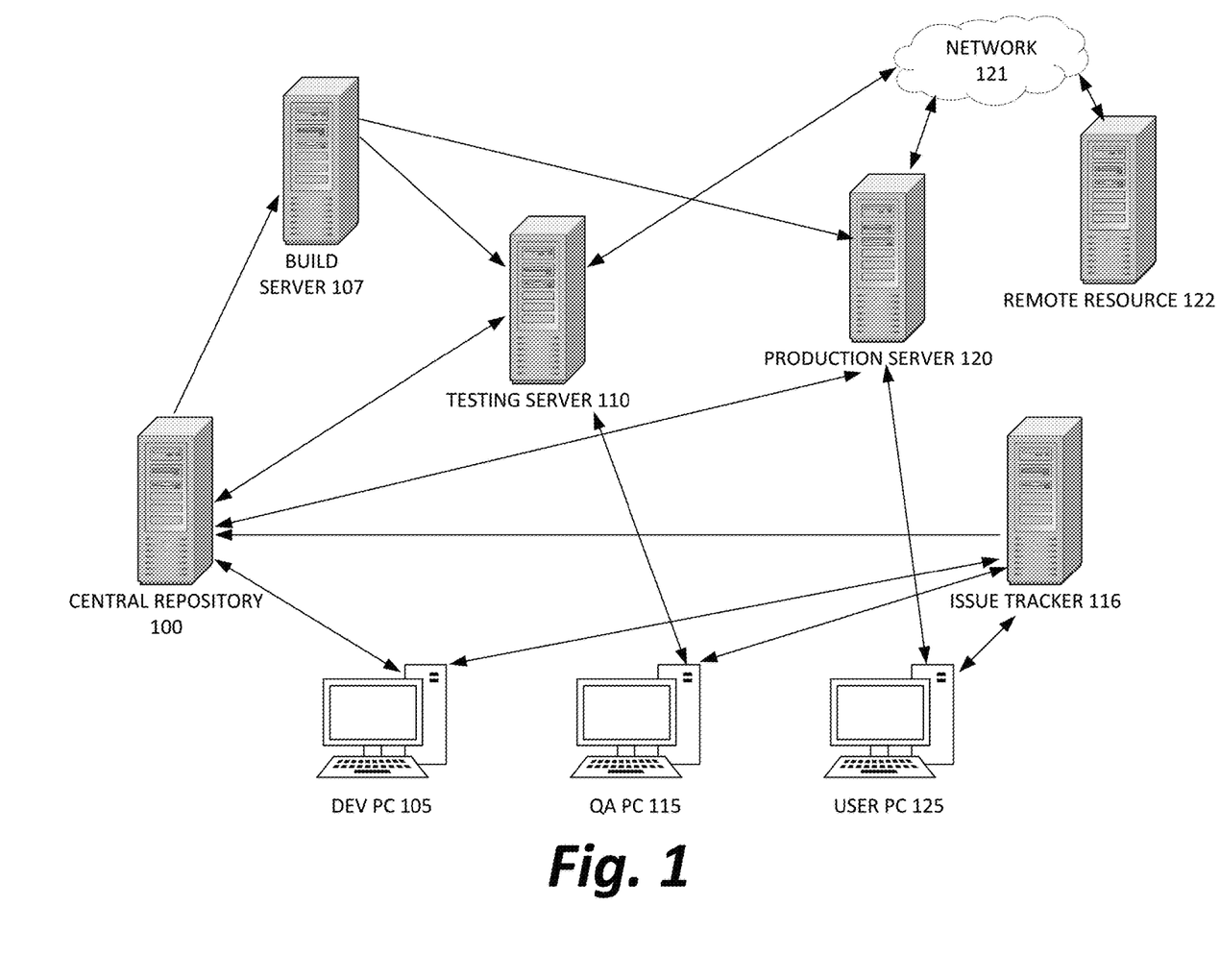
FIG. 1 depicts a system for development and publication of software services involving a server and client.

FIG. 1 depicts a system for development and publication of software services involving a server and client.

A central repository 100 receives source code and/or unit tests from one or more developers' computers 105, written by the developers locally as well as possibly tested by the developers on those computers 105.

The central repository 100 may then send the code to a continuous build server 107, which converts the code into any intermediate or final form in preparation for execution. The build server 107 may then send the application to testing server 110, where it is interpreted or executed, as appropriate for a given programming language or coding system, to provide a client-side user interface or server-side capabilities in conjunction with an application. A number of quality assurance (QA) testers may use QA computers 115 to access the user interface of the application and test its functionality. The users of the QA computers may access an interface of issue tracker server 116 in order to describe a bug, create a service ticket, or otherwise notify developers that an issue with the software exists. When a ticket is created or updated, a notification may be generated by the issue tracker server 116 and sent to the developers and or QA testers. Developers may respond to an issue by uploading new code to the central repository 100, and central repository 100 may have access to the data on the issue tracker server in order to compile a list of issues about any given application.

If code is believed to be ready for use by end users, it can be published to a production server 120, which acts similarly to the testing server 110 but is accessible by users' computing devices 125, by users who are using the application for its intended purpose rather than to test it for errors. The users may also report bugs or other issues to the issue tracker server 116.

Applications executed on the testing server 110 or production server 120 may access, via a network 121, a remote computing device 122. Requests or commands may be transmitted to remote computing device 122 to take advantage of an API of that device to get information, store data, perform calculations, etc.

Central repository 100 may have access to a number of other servers storing additional data about the code or associated with it. For example, a policy server (not pictured) may store a number of rules or guidelines with which code is to comply, such as best coding practices, requirements for comments or other internal documentation, or naming conventions for software elements. Testing server 110 or production server 120 may report back to central repository 100 with metrics about the execution of a given application, such as its total CPU (central processing unit) utilization, total disk usage, total network usage uploading or downloading, or total numbers of function calls or other actions taken by the code during execution and recorded by additional debugging statements added to the code before execution.

Although depicted as separate computers, functionality of multiple components or computing devices described above and below may be combined into a single computing device. For example, a single server 100 could act as the code repository as well as the server for both the testing and production environments, using a server application to direct incoming traffic to an appropriate application for action upon a message. For another example, the developers could act as QA testers, making computing devices 105 and 115 identical.

Figure 2:
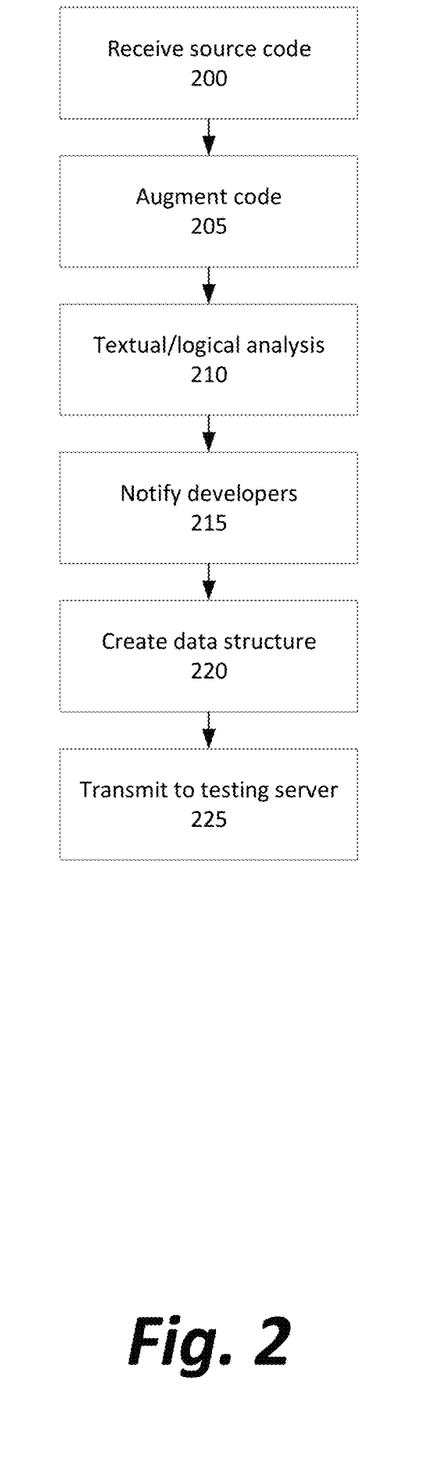
FIG. 2 depicts a method for analyzing and modifying software code before execution in a testing or production environment.

FIG. 2 depicts a method for analyzing and modifying software code before execution in a testing or production environment.

Initially, code is received by central repository 100 for storage before compilation and/or execution (Step 200).

The received code may be augmented by a number of debugging function calls around other function calls (Step 205) to allow for passive analysis of the code as it actually runs.

For example, every function call to get data from an input device or send data to an output device may be preceded or succeeded by a function that stores, summarizes, or otherwise analyzes the data or the circumstances of the function call, so when the original function call is made, the associated debug function call is made. Storing, for example, might include keeping information on every single function call, including but not limited to the timestamp of the call, the parameters input to the call, the line number of the code at which the function occurs. Summarizing, in contrast, might include merely counting the number of times a call was made over a time interval, or the total number of times an attempt was made to access a particular input or output device.

Similarly, other data about function calls may be analyzed:

Every call to an external API supplied by a third-party may have the parameters of the API call stored, summarized, or otherwise analyzed.

Every call to a credentialing server to get a session token, cookie, or other credential data may have the user ID, password, or other circumstances of the request stored/summarized/analyzed.

Every call to add into, remove from, or modify data within an external database may have the query string, request metadata, or response stored/summarized/analyzed.

Every call to an external software library or dynamic linked library may have the parameters of the requested function of that library or its response stored/summarized/analyzed.

Every request made to a mainframe computer may have the parameters of the request stored/summarized/analyzed.

Every request made to an exchange server or LDAP (Lightweight Directory Access Protocol) is stored/summarized/analyzed.

Every request made to a message queues may be stored/summarized/analyzed for dependency evaluation.

Every reference to a batch component that is a scheduler job may be stored/summarized/analyzed.

Every request for usage or application entitlements within an entitlements system may be stored/summarized/analyzed.

Every reference to vendor and third-party libraries, packages, and NuGet dependencies may be detected and analyzed.

Component types such as UI, UI services, WebServices, batch components and DB projects may be detected and analyzed.

Calls to plug-and-play architectures, to cloud computing environments, and other external entities may be stored/summarized/analyzed.

In an alternative to adding debug functions in parallel to the intended function calls that proceed as normal, data may be gathered by introducing an intermediate software module that intercepts various function calls as described above. For example, calls in the source code to a given external address may be replaced by calls to a server that will store/summarize/analyze those calls before forwarding them from the intermediate software module to the intended external address.

Alternatively, data may be gathered from a log generated by software itself during the running of the software, independent of any injected debugging and observation code.

Alternatively, data may be gathered by having a router or other software or hardware, positioned between a machine executing the code and an external resource needed by the code, review all messages sent through the router using an API, query language, or other method of communicating with the external resource. The data regarding the parameters or context of those calls may be stored/summarized/analyzed.

The code may also be actively analyzed at the central repository 100 using textual or logical analysis of the code (Step 210). For example, naïve text search for particular substrings within source code may be performed, to see if particular functions, libraries, IP addresses, usernames, passwords, server names, expressions, or whole lines of code are present. For example, a search might be performed to see if the username or password of any developer occurs in the code, as hardcoded security credentials may represent a security risk or a bug where an intended user's credentials are not being used instead.

In more sophisticated embodiments, regular expression text search may be used to see if any code matches a particular pattern. For example, a template of one or more lines of code considered to be "bad code" may have each variable name replaced by a wildcard and searched for to see whether code contains statements that are logically equivalent to the identified "bad code." A library of so-called coding "anti-patterns" may be established and instances of those anti-patterns identified in the code, even before testing occurs.

In yet further sophisticated embodiments, logical analysis may be performed on the code to determine nonsensical coding practices. Examples of nonsensical practices may include initializing a variable that is never modified or accessed after initialization, conditional statements whose condition either cannot be true or cannot be false, lines of code that will never be executed due to a logical flow through the software, requests to close a file handle or connection that is never open, etc.

Particularly of note are unit tests or "asserts" in the code that do not adequately test for software quality, or do not actually perform any quality assurance function at all. For example, if constraints are meant to be enforced on input of a function to sanitize its input, but a developer has replaced an "assert" that actually checks the input with one that says "assert (true)" or "assert (1=1)", the code may appear to have a level of robustness that is actually lacking due to the cutting of corners by the developer. Textual or logical analysis may be used to determine the existence of fraudulent quality assurance tests, and to determine a total coverage of the code by unit tests that are actually checking code inputs.

Developers may be automatically notified of the results of textual or logical analysis by transmitting a notification to the developers' computing devices 105 (Step 215), in order to allow them to focus on fixing possible errors in their code.

A data structure may be created (Step 220) to store information related to the active analysis (Step 210) and incoming data passively received during use (consequent to Step 205), as well as additional information that may be generated about the application during use by a testing server 110 executing the code or by the human developers and users, such as bug reports and bugfixes.

Finally, the augmented code is transmitted to the testing server 110 (Step 225) for use by the QA testers and for the passive gathering of data for analysis during that testing.

Figure 3:
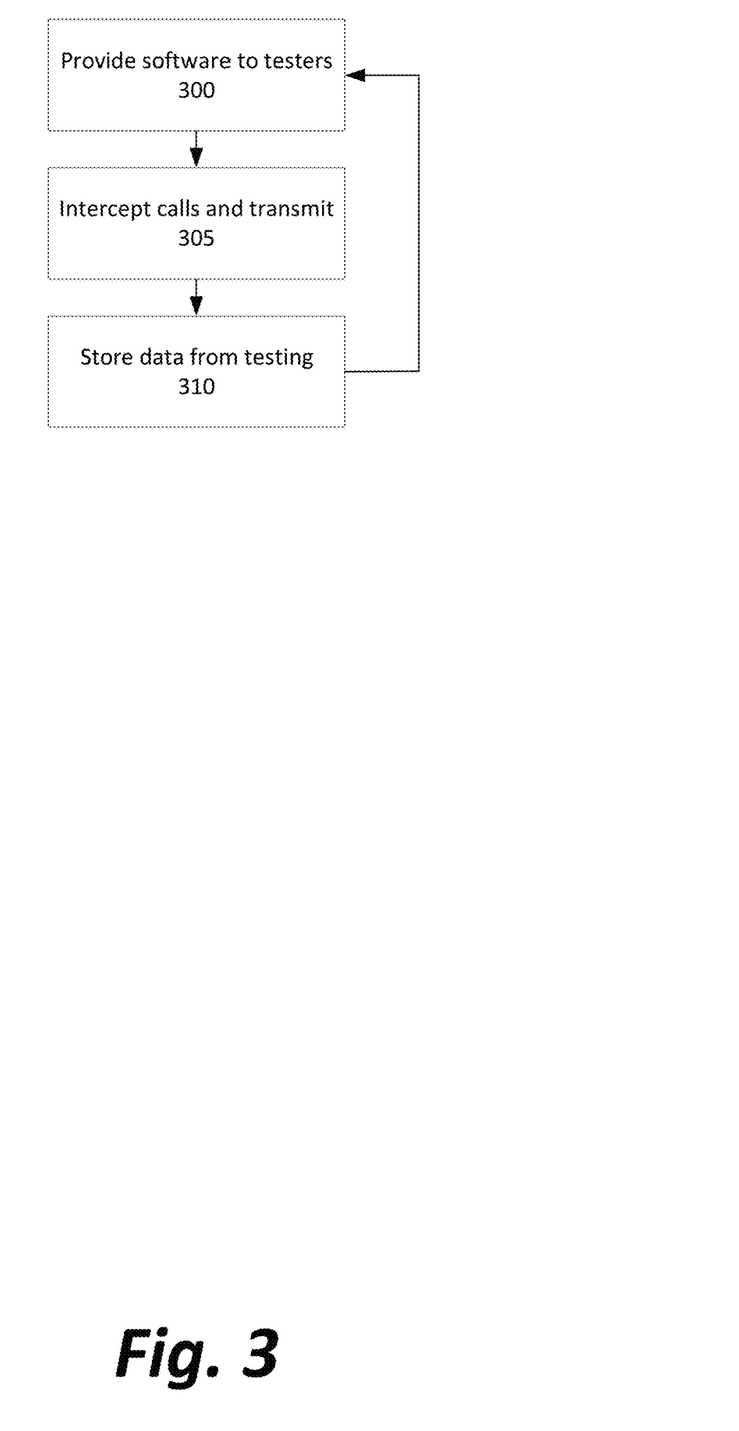
FIG. 3 depicts a method of analyzing the use of software during execution in a testing environment to determine application readiness.

FIG. 3 depicts a method of analyzing the use of software during execution in a testing environment to determine application readiness.

Once the code is running on a testing server 110 and provided to the testers as a user interface (Step 300), the inserted debug calls or associated with various functions are performed at the same time as those function calls, or those function calls are intercepted by the intermediate module or otherwise logged by the system. The data from those intercepted or associated calls is sent to the central repository (Step 305) for storage (Step 310) in the data structure of that repository (which was created in Step 220). The storage and transmission of more data (Steps 305 and 310) are repeated throughout a continuous testing period of the software as developers act upon the results of the textual analysis, logical analysis, and/or reports of bugs or other issues by users.

At any given time, an administrator may be able to request a graphical user interface (GUI) to be generated that allows for quick analysis of the current readiness of the code for publication. The GUI may depict, among other data points: numbers of outstanding bugs in the issue tracker; a timeline of code check-ins or bugfixes; a timeline of filed bug reports; a dependency tree of libraries, languages, or other features needed for the full application to be executed; a highlighting of any deprecated libraries, languages, or other features used by the application; a list of databases, external APIs, or other external/remote dependencies of the code; numbers of calls to those external dependencies; CPU, disk, network, or other resource usages of the application; numbers of check-ins, of lines of code checked in, or bugs fixed by each particular developer in the application. The GUI may also visualize how each of these factors affect an overall application fitness score, as described below.

Further, the GUI may show how the application relates to other upstream or downstream applications within a network of dependencies. Accordingly, it can be determined how many potential external points of failure an application has by depending on the functioning of other software, as well as demonstrating how many other applications will be affected if the given application has an error. This data can be used in determining how stringent a requirement for software publication, as described below, should be.

Figure 4:
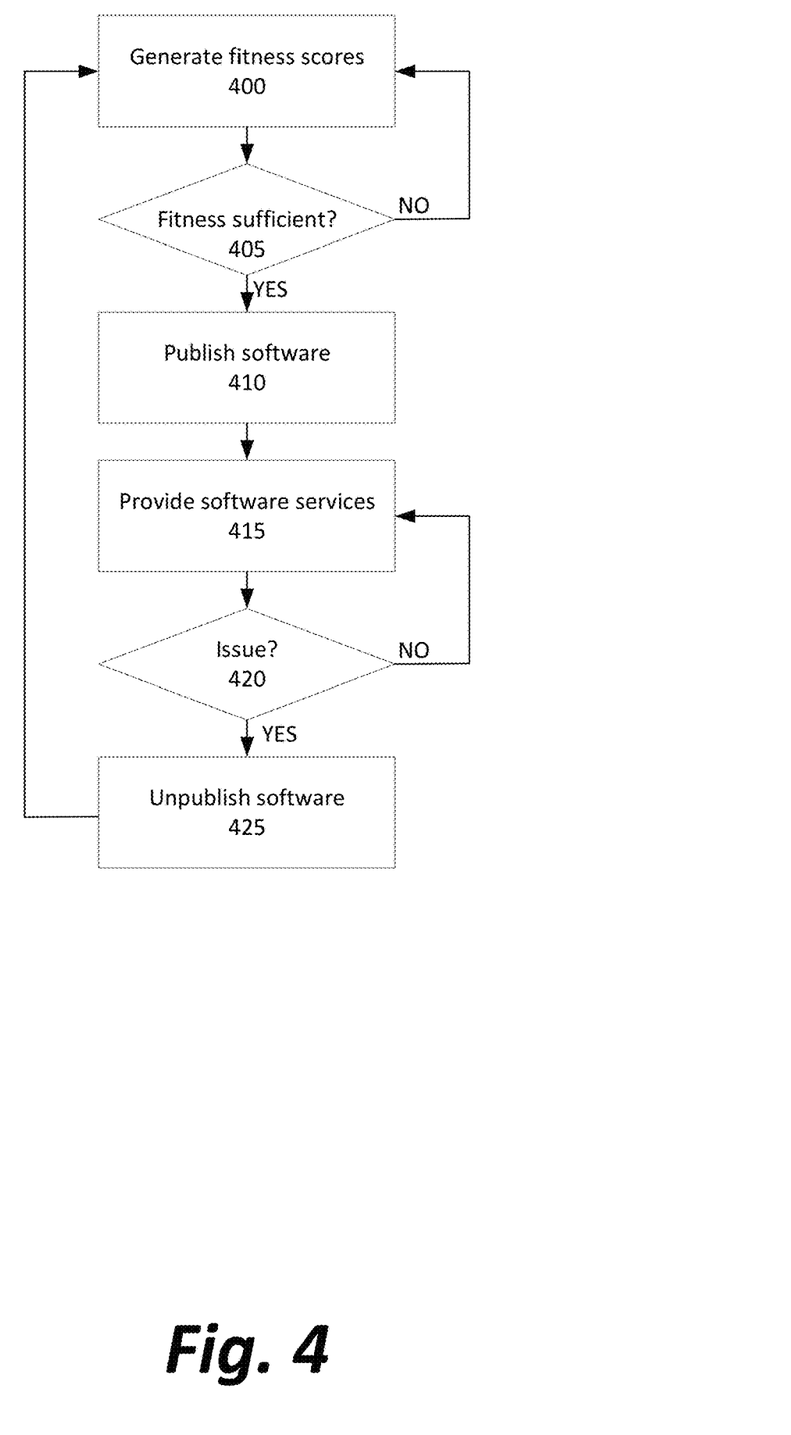
FIG. 4 depicts a method for publishing software code from a testing environment into a publication environment, and for, if necessary, unpublishing it.

FIG. 4 depicts a method for publishing software code from a testing environment into a publication environment, and for, if necessary, unpublishing it.

After an application has been in a testing environment for a period of time, a significant amount of data may have been generated through automated textual analysis, recordation of function calls and application use of resources, and tester- or developer-generated information such as bug reports and bugfixes. The central repository may take into account a number of predetermined criteria including this data to determine whether software is ready for publication and access by end users, publishing the software only if all criteria are satisfied, or only if at least a minimum number of criteria are satisfied.

In a preferred embodiment, fitness scores may be generated (Step 400) for a number of dimensions of the code. Each fitness score may be a binary "ready/not ready," or multiple states (such as green light, yellow caution, or red light), or may involve a quantified number. Ultimately, the fitness scores may be combined to produce an overall application fitness score, which again, may be a simple "ready/not ready," one of several discrete states, or a numerical value.

Factors which may have a unique fitness score or may be combined with other elements to produce a fitness score encompassing multiple factors may include, among others:

Use of open-source third party code or of private third-party code

Use of a software library that is deprecated or may become deprecated

Use of a software library or of functions that are not compatible with a cloud-computing environment Use of a software library, mainframe, or service that has licensing fees or use fees Presence of design anti-patterns in the code Existence of unfixed bug reports from user testing Amount of the code covered by unit tests Amount of code that is logically impossible to execute Existence of fraudulent unit tests or assert statements Calls to input or output devices that may not be present in the production environment, such as a mouse, keyboard, printer, or monitor Attempts to read files from or write files to a hardcoded absolute file address that is not present in the production environment.

Attempts to read files from or write files to a hardcoded relative file address (e.g., to another subdirectory of the same parent directory) that is not present in the production environment.

Attempts to access a hardcoded IP address or server name

Attempts to query an external database

Attempts to access a particular server, such as a mainframe

Attempts to obtain credentials using hardcoded information

Code that appears to rely on other qualities of the development or testing environment which are not necessarily present in the production environment Numbers of function calls, including calls to an API of a third-party service Numbers of lines of code contributed to the application over time Numbers of pull requests, code check-ins, or code reviews to the application by developers over time Whether an application uses a generic, rule-based engine that operates from an easily modifiable configuration file, as opposed to hard-coding rules or configuration values within the code itself Resource utilization by the code during testing in the testing environment Values may be associated with each of the above factors. For example, a negative value could be associated with high resource usage, because if resource usage is already high in the testing environment, it will likely be even higher in a production environment with more users. In contrast, a positive value may be associated with a high number of fixed bugs and frequent code check-ins, showing that developers appear to be improving the overall code quality.

The values may be received as a configuration file determined by human users and loaded by a human user into the central repository so that code running on the central repository can convert the data related with the above factors into a final score based on any additions to or subtractions from a base score. For example, code may by default have 100% readiness but be decremented by 1% per every thousand calls made to an expensive external API service, encouraging development to minimize the number of external API calls. In another example, code may by default have 0% readiness, and gain 10% readiness for each of 10 factors that are determined to have met an acceptable predetermined threshold.

The configuration may also include a predetermined required application fitness score value, so that once the code meets or exceeds that standard, it may be published. The total required fitness score may be set to an extremely high value, or the individual.

The software publication may have one or more other criteria for publication unrelated to data gathered about the software, such as a launch date before which the software cannot be published, a list of requirements to comply with legal, financial, or an approval needed by a human manager or other user with authorization to publish the software assuming that all other necessary criteria are met.

If the predetermined criteria, including the total fitness score, are all met (Step 405), software may automatically be sent to the production server 120 (Step 410) and continually executed when requested by end users (Step 415). If the total fitness score is not sufficiently high, the system will wait until a change to the fitness score occurs (back to Step 400).

Central repository 100 may continuously check whether an error has been registered in the code, or whether any other changes, including deprecation of a library used by the code or shutdown of an external dependency of the code has occurred (Step 420). If not, the production environment continues as normal (back to Step 415).

If an error or other issue does exist, central repository 100 may reevaluate the application fitness score in light of the error and determine that unpublishing of the code until the code has been fixed is appropriate (Step 425). Other responses may include: updating the textual and logical analysis process to search for exact lines of code that are known to have caused the problem (in case they have been copied and pasted multiple times in the code) or for patterns that match problematic code; generating a report showing which lines of code or dependencies changed since the last iteration of the code appearing to lack the error, in order to triage where the error may have occurred; and associating any errors or changes in fitness score with the particular software developer who introduced changes in the code causing the change in fitness score.

Figure 5:
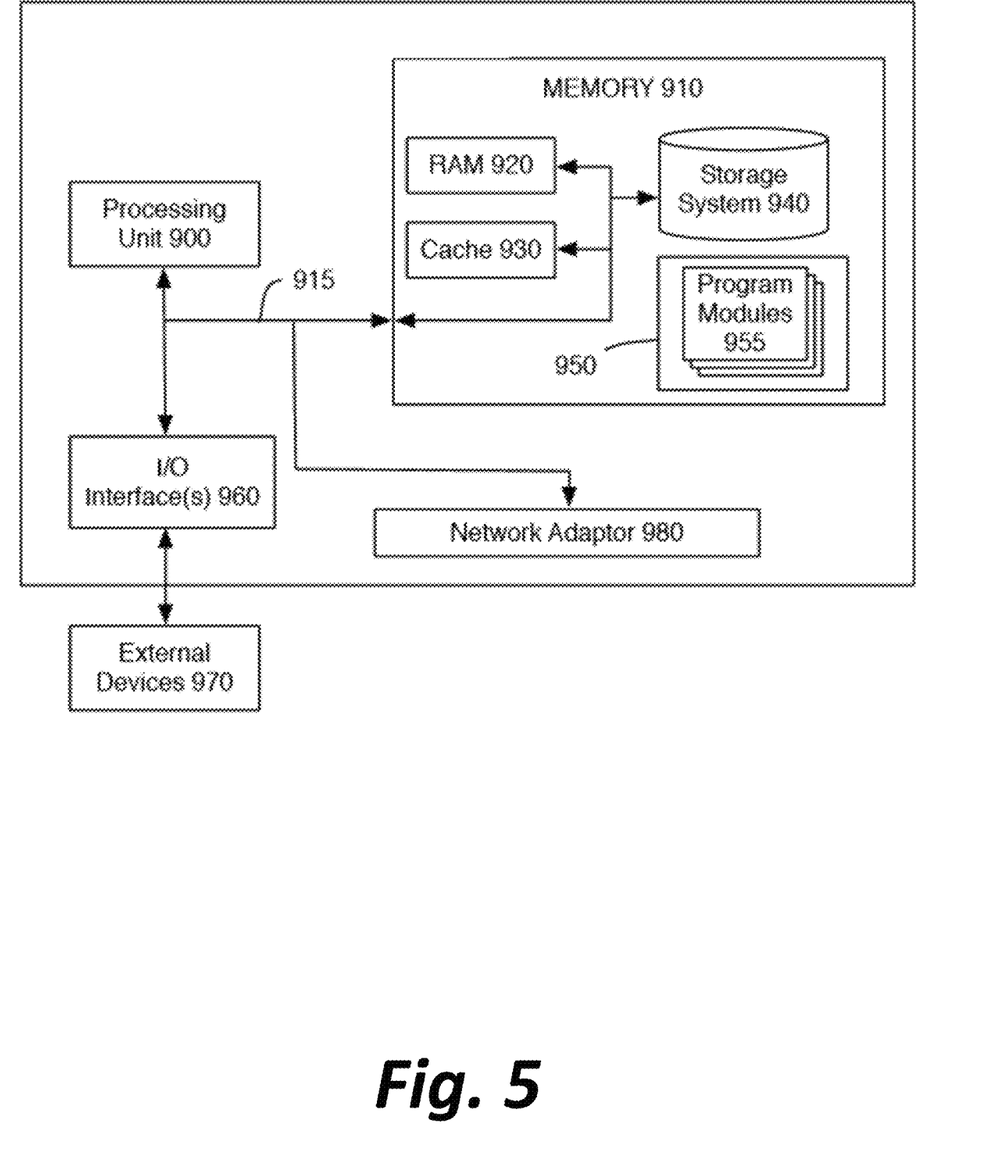
FIG. 5 depicts a general computing device for performing a number of features described above.

FIG. 5 is a high-level block diagram of a representative computing device that may be utilized to implement various features and processes described herein, for example, the functionality of central repository 100, testing server 110, or production server 120. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 5, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A method of software version management, comprising:
   receiving, by a central server and from computing devices of one or more software developers, source code for an application;
   automatically scanning the source code and system code with which the source code interacts to identify external resources with which the source code will attempt to interact at runtime, and to identify dependencies of the identified external resources interacted by the source code comprising a needed entitlement, a needed software library, a needed security privilege, a needed configuration file, or a needed infrastructure feature;
   automatically generating modified source code by inserting into the source code additional code to track different numbers of attempts to the identified external resources comprising: a number of attempts made to obtain any security token, a number of attempts made to query any external database, a number of attempts made to obtain application entitlements, a number of attempts made to communicate with any mainframe to execute any stored procedure, and a number of attempts made to invoke any application programming interface or software library that is not compatible with an environment to which the source code will be published;
   executing the modified source code;
   during execution of the modified source code, automatically tracking the number of attempts made to obtain any security token, the number of attempts made to query any external database, the number of attempts made to obtain application entitlements, the number of attempts made to communicate with any mainframe to execute any stored procedure, and the number of attempts made to invoke any application programming interface or software library that is not compatible with an environment to which the source code will be published;
   receiving a configuration associating each of the tracked numbers of attempts and each identified external resource with which the source code would attempt to interact at runtime with a change in fitness score;
   based at least in part on each of the tracked numbers of attempts and on the change in fitness score associated with each of the tracked numbers of attempts, determining a total application fitness score;
   automatically publishing the source code to a production environment if the total application fitness score exceeds a predetermined threshold and if the total application fitness score does not exceed the predetermined threshold, waiting and not publishing the source code to the production environment until the total application fitness score exceeds the predetermined threshold;
   receiving a notification of a deficiency related to one of the identified external resources that the published source code attempted to access; and
   in response to the notification, automatically unpublishing the published source code from the production environment.

2. The method of claim 1, further comprising:
   receiving a notification of a critical malfunction by the published source code in the production environment; and
   identifying software changes that occurred since a last publication of the published source code to the production environment.

3. The method of claim 1, further comprising:
   analyzing text of the source code and the identified external resources with which the source code would attempt to interact at runtime to determine that a coding anti-pattern has been used;
   determining that one or more prior incidents were caused at least in part by presence of the coding anti-pattern in the published source code; and
   adjusting the total application fitness score responsive to the determined presence of the coding anti-pattern.

4. The method of claim 1, further comprising:
   analyzing text of the source code and the identified external resources with which the source code would attempt to interact at runtime to determine a failure of a unit test to test a portion of source code; and adjusting the total application fitness score responsive to the determined failure of the unit test to test the portion of source code.

5. The method of claim 1, further comprising: generating a graphical user interface that displays a plurality of the identified external resources and each of the tracked numbers of attempts.

6. The method of claim 1, further comprising: associating each change in fitness score with a software developer of the one or more software developers who developed a portion of the source code causing that change in fitness score.

7. The method of claim 1, further comprising:
automatically determining that a transmission of credentials was made or requested by the modified source code during execution;
automatically determining that the credentials were hardcoded in the source code rather than entered by a human user at runtime; and
adjusting the total application fitness score responsive to the determined hardcoded credentials.

8. The method of claim 1, wherein the software library is a deprecated software library.

9. The method of claim 1, wherein the application programming interface is an API of a remote service.

10. The method of claim 1, wherein the software library is used to access an input/output device of a Computing device.

11. The method of claim 1, further comprising tracking a number of attempts made to access a relative file reference.

12. The method of claim 1, further comprising tracking a number of attempts made to access an absolute file reference.

13. The method of claim 1, wherein the fitness score is also based at least in part on whether a human user has authorized publication of the source code to the production environment.

14. The method of claim 1, further comprising:
automatically tracking developer productivity and developer quality by determining numbers of times that each of the one or more software developers checked in a change to the source code and fixed a bug in the source code, respectively; and
adjusting the total application fitness score responsive to the developer productivity and developer quality.

15. The method of claim 1, further comprising:
automatically detecting a choice by one of the one or more software developers to express the source code in manner that does or does not comply with a development, security, or infrastructure guideline; and
adjusting the total application fitness score responsive to the automatic detection.

16. The method of claim 1, wherein the total application fitness score is additionally based at least in part on how many applications or which applications from a set of other similar applications would be affected by an error in the application, where similarity is determined based on copied code lines or copied code patterns between the application and other applications.

17. The method of claim 1, further comprising:
automatically determining that a transmission to a particular internet protocol address or server address was made or attempted by the modified source code during execution;
automatically determining that the particular internet protocol address or server address was hardcoded in the source code rather than loaded from a configuration; and
adjusting the total application fitness score responsive to the determined hardcoded particular internet protocol address or server address.

18. The method of claim 1, further comprising:
automatically determining a proportion of total code coverage by unit tests associated with the source code; and
adjusting the total application fitness score responsive to the determined proportion of total code coverage.

19. The method of claim 1, further comprising:
automatically determining a proportion of the source code that is logically impossible to execute due to a conditional statement that always or never triggers; and
adjusting the total application fitness score responsive to the determined proportion of the source code that is logically impossible to execute.

20. The method of claim 1, further comprising:
automatically determining, for each software application in a set of software applications running in an environment to which the source code will be published, a set of other software that represents an upstream or downstream dependency of the each software application; and
responsive to a determination that a software error has occurred in the upstream or downstream dependency, adjusting the total application fitness score and updating a graphical user interface to display the upstream or downstream dependency and the software error.

21. A software publication system for determining software cloud readiness, comprising:
a first computing device;
a production environment computing device;
a processor; and
non-transitory memory containing instructions that, when executed by the processor, cause the processor to:
receive, from computing devices of one or more software developers, source code for an application;
automatically scan the source code and system code with which the source code interacts to identify external resources with which the source code will attempt to interact at runtime, and to identify dependencies of the identified external resources interacted by the source code comprising a needed entitlement, a needed software library, a needed security privilege, a needed configuration file, or a needed infrastructure feature;
automatically generating modified source code by inserting into the source code additional code to track different numbers of attempts to the identified external resources comprising: a number of attempts made to obtain any security token, a number of attempts made to query any external database, a number of attempts made to obtain application entitlements, a number of attempts made to communicate with any mainframe to execute any stored procedure, and a number of attempts made to invoke any application programming interface or software library that is not compatible with an environment to which the source code will be published;
receive, from the first computing device, during execution of the modified source code, an automatically tracked number of attempts made to obtain any security token, a number of attempts made to query any external database, number of attempts made to obtain application entitlements, number of attempts made to communicate with any mainframe to execute a stored procedure, and number of attempts made to invoke any application programming interface or software library that is not compatible with an environment to which the source code will be published;

receive a configuration associating each of the numbers of attempts with a change in fitness score;

based at least in part on each tracked number of attempts and on the change in fitness score associated with each of the tracked numbers of attempts determining a total application fitness score;

automatically publish the source code to the production environment computing device if the total application fitness score exceeds a predetermined threshold and if the total application fitness score does not exceed the predetermined threshold, wait and not publish the source code to the production environment by until the total application fitness score exceeds the predetermined threshold;

receive a notification of a deficiency related to one of the identified external resources that the published source code attempted to access; and in response to the notification, automatically cause the published source code to be unpublished from the production environment computing device.

22. The system of claim 21, wherein the instructions, when executed, further cause the processor to:

receive a notification from the first computing device that a transmission of credentials was made or requested by the modified source code during execution; and automatically determining that the credentials were hard-coded in the source code rather than entered by a human user at runtime.

23. The system of claim 21, wherein the instructions, when executed, further cause the processor to:

analyze text of the source code and the identified external resources with which the source code would attempt to interact at runtime to determine that a coding anti-pattern has been used;

determine that one or more prior incidents were caused at least in part by presence of the coding anti-pattern in the published source code and adjust the total application fitness score responsive to detecting the coding anti-pattern.

24. The system of claim 21, wherein the instructions, when executed, further cause the processor to:

analyze text of the source code to determine a failure of a unit test to test a portion of the source code; and adjust the total application fitness score responsive to the failure of the unit test to test the portion of source code.

25. The system of claim 21, wherein the instructions, when executed, further cause the processor to: generate a graphical user interface to display data concerning numbers of bugs in the source code fixed by each of the software developers operating on the source code, numbers of pull requests made by each of the software developers, numbers of code check-ins performed by each of the software developers, and numbers of code reviews performed by each of the software developers, and to display how the bugs fixed or code checked in changed the total application fitness score.

26. The system of claim 25, wherein the instructions, when executed, further cause the processor to: associate each particular change in the total application fitness with each individual of the software developers and display the each particular change associated with the each individual of the software developer in the graphical user interface.

27. A method of software version management to determine cloud-readiness, comprising:

receiving; by a central server and from computing devices of one or more software developers, source code for an application;

automatically scanning the source code and system code with which the source code interacts to identify external resources with which the source code will attempt to interact at runtime, and to identify dependencies of the identified external resources interacted by the source code comprising a needed entitlement, a needed software library, a needed security privilege, a needed configuration file, or a needed infrastructure feature;

automatically generating modified source code by inserting into the source code additional code to track different numbers of attempts to the identified external resources comprising: a number of attempts made to obtain any security token, a number of attempts made to query any external database; a number of attempts made to obtain application entitlements, a number of attempts made to communicate with any mainframe to execute any stored procedure, and a number of attempts made to invoke any application programming interface or software library that is not compatible with an environment to which the source code will be published;

executing the modified source code;

during execution of the modified source code, automatically tracking the number of attempts made to obtain any security token, the number of attempts made to query any external database, the number of attempts made to obtain application entitlements, the number of attempts made to communicate with any mainframe to execute any stored procedure, and the number of attempts made to invoke any application programming interface or software library that is not compatible with an environment to which the source code will be published;

receiving a configuration associating each of the tracked numbers of attempts and each identified external resource with which the code would attempt to interact at runtime with a change in fitness score;

automatically determining whether the source code is compatible with a cloud-computing environment based on presence of a software architecture with which the source code interacts;

automatically counting numbers of software dependencies including a number of upstream software dependencies by the source code and a number of downstream dependencies upon the source code;

based at least in part on the automatic determination regarding compatibility with the cloud-computing environment, on the automatically counted numbers of software dependencies, and on each of the tracked numbers of attempts and on the change in fitness score associated with each of the tracked numbers of attempts, determining a total application fitness score;

automatically publishing the source code to a production environment if the total application fitness score exceeds a predetermined threshold and if the total application fitness score does not exceed the predetermined threshold, waiting and not publishing the source code to the production environment until the total application fitness score exceeds the predetermined threshold;

receiving a notification of a software issue that would change the total application fitness score; and in response to the notification, automatically unpublishing the published source code from the production environment and automatically determining other software in the production environment that may be affected by the software issue.

* * * * *